(12) United States Patent
Hulsey et al.

(10) Patent No.: US 8,975,884 B2
(45) Date of Patent: Mar. 10, 2015

(54) TWO-PHASE TRANSFORMER-COUPLED BOOST CONVERTER

(75) Inventors: Stephen J. Hulsey, Los Angeles, CA (US); Stephen Raiser, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 1533 days.

(21) Appl. No.: 12/413,110

(22) Filed: Mar. 27, 2009

(65) Prior Publication Data

US 2010/0244792 A1    Sep. 30, 2010

(51) Int. Cl.
*G05F 1/40* (2006.01)
*H02M 3/18* (2006.01)
*H02M 3/158* (2006.01)

(52) U.S. Cl.
CPC .................... *H02M 3/1584* (2013.01)
USPC ............................. 323/282; 363/59

(58) Field of Classification Search
USPC ......... 323/259, 273, 276, 282, 285, 344, 351; 363/59, 101
See application file for complete search history.

(56) References Cited

U.S. PATENT DOCUMENTS

| | | | | |
|---|---|---|---|---|
| 3,913,000 | A * | 10/1975 | Cardwell, Jr. .................... | 363/20 |
| 5,438,499 | A * | 8/1995 | Bonte et al. .................. | 363/21.16 |
| 5,991,172 | A * | 11/1999 | Jovanovic et al. ......... | 363/21.14 |
| 6,239,584 | B1 * | 5/2001 | Jang et al. ..................... | 323/222 |
| 6,525,435 | B2 | 2/2003 | Lau et al. | |
| 6,594,158 | B2 * | 7/2003 | Batarseh et al. ................ | 363/16 |
| 7,016,205 | B2 * | 3/2006 | Steigerwald et al. ........... | 363/40 |
| 7,233,132 | B1 | 6/2007 | Dong et al. | |
| 7,606,051 | B1 * | 10/2009 | Wittenbreder, Jr. ............. | 363/39 |
| 7,768,807 | B2 * | 8/2010 | Chen et al. .................... | 363/127 |
| 2005/0024803 | A1 * | 2/2005 | Ying et al. ...................... | 361/82 |
| 2005/0226012 | A1 * | 10/2005 | Jovanovic et al. .............. | 363/59 |
| 2005/0243579 | A1 * | 11/2005 | Jang et al. ....................... | 363/16 |
| 2007/0063679 | A1 | 3/2007 | Weng et al. | |
| 2007/0175701 | A1 | 8/2007 | Xu et al. | |
| 2008/0067990 | A1 | 3/2008 | Wei | |
| 2011/0149610 | A1 * | 6/2011 | Moussaoui et al. ........ | 363/21.04 |

OTHER PUBLICATIONS

German Office Action, dated Oct. 26, 2012, for German Patent Application No. 10 2010 002 074.5.

* cited by examiner

*Primary Examiner* — Adolf Berhane
(74) *Attorney, Agent, or Firm* — Ingrassia Fisher & Lorenz, P.C.

(57) ABSTRACT

Various embodiments provide two-phase boost converters. One two-phase boost converter includes a node configured to be coupled to an input voltage and a transformer coupled to the node. The transformer includes primary and secondary windings, an inductor coupled in series with the primary winding, and an inductor coupled in series with the secondary winding. Another two-phase boost converter includes an inductor configured to be coupled to an input voltage, a node coupled to the inductor, and a transformer coupled to the node. The transformer includes primary and secondary windings, an inductor coupled in series with the primary winding, and an inductor coupled in series with the secondary winding. Yet another two-phase boost converter includes a transformer coupled to first and second external inductors. The transformer includes primary and secondary windings, an inductor coupled in series with the primary winding, and an inductor coupled in series with the secondary winding.

17 Claims, 5 Drawing Sheets

TWO-PHASE TRANSFORMER-COUPLED BOOST CONVERTER

FIELD OF THE INVENTION

The present invention generally relates to boost converters, and more particularly relates to two-phase transformer-coupled boost converters.

BACKGROUND OF THE INVENTION

Contemporary two-phase boost converters operate relatively well for a boost ratio of 2:1. That is, the ripple current in transformer windings for a boost ratio of 2:1 is low because of the magnetizing inductance of the transformer windings. However, when the desired boost ratio is other than 2:1, the transformer windings do not sufficiently reduce the ripple current and the two-phase boost converter does not operate efficiently. Specifically, when contemporary two-phase boost converters are configured to provide a boost ratio other than 2:1, the ripple current in the transformer is excessively high, which results in power dissipation and heat.

Accordingly, it is desirable to provide transformers for two-phase boost converters and two-phase boost converters that operate more efficiently than contemporary boost converters at boost ratios other than 2:1. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Various embodiments provide two-phase boost converters. One two-phase boost converter comprises a node configured to be coupled to an input voltage and a transformer coupled to the node. The transformer comprises a primary input coupled to the node, a primary winding coupled to the primary input, and a first inductor coupled in series with the primary winding. The transformer further comprises a secondary input coupled to the node, a secondary winding coupled to the secondary input, and a second inductor coupled in series with the secondary winding.

Another two-phase boost converter comprises a first inductor configured to be coupled to an input voltage, a node coupled to the first inductor, and a transformer coupled to the node. The transformer comprises a primary input coupled to the node, a primary winding coupled to the primary input, and a second inductor coupled in series with the primary winding. The transformer further comprises a secondary input coupled to the node, a secondary winding coupled to the secondary input, and a third inductor coupled in series with the secondary winding.

Yet another two-phase boost converter comprises a node configured to be coupled to an input voltage, first and second inductors coupled to the node, a transformer coupled to the first and second inductors. The transformer comprises a primary input coupled to the first inductor, a primary winding coupled to the primary input, and a third inductor coupled in series with the primary winding. The transformer further comprises a secondary input coupled to the second inductor, a secondary winding coupled to the secondary input, and a fourth inductor coupled in series with the secondary winding.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
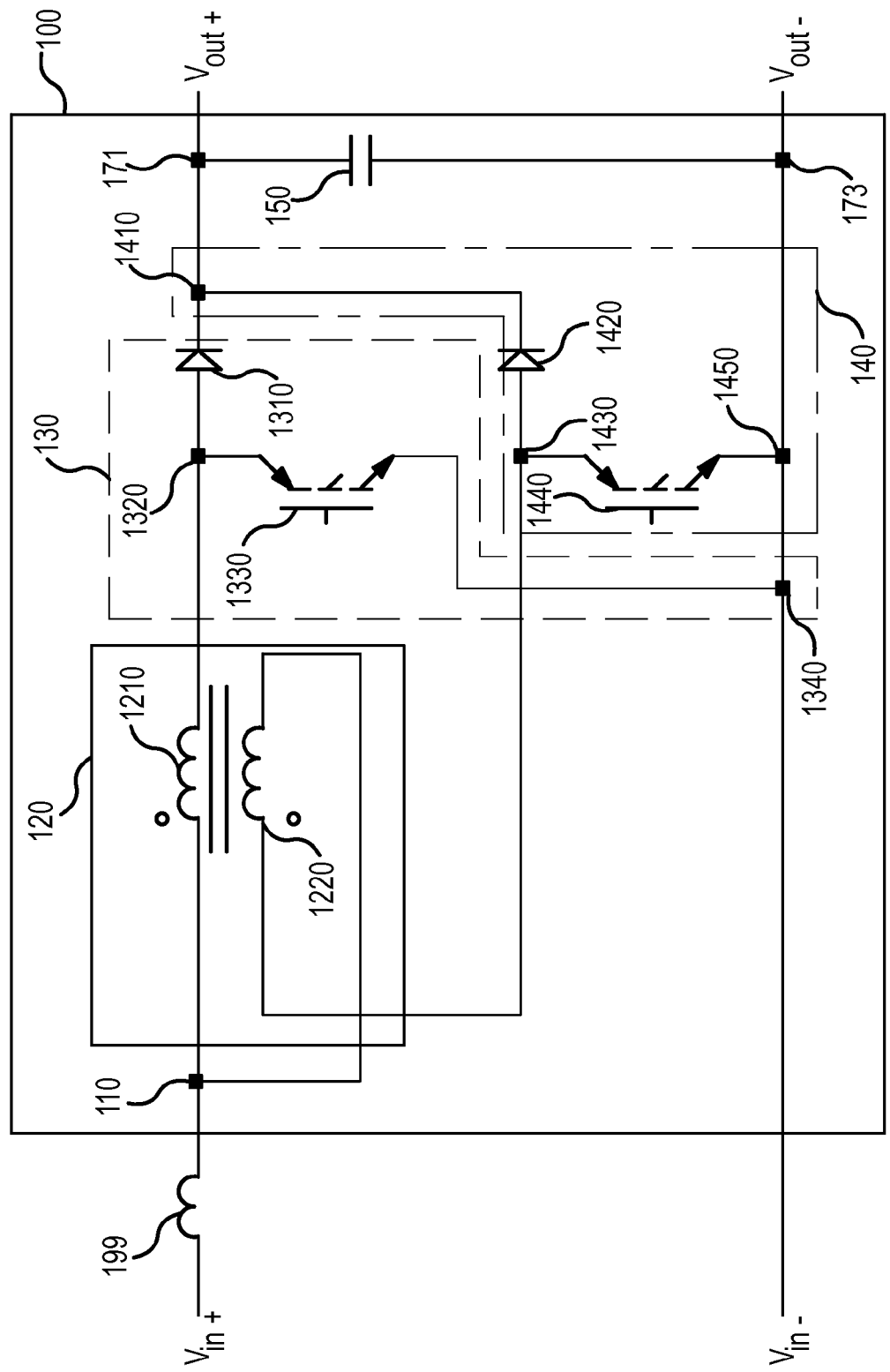
FIG. 1 is a schematic of a prior art two-phase boost converter connected to an external inductor.

FIG. 1 is a schematic diagram of a prior art two-phase boost converter 100 connected to an external inductor 199 that is connected to a positive input voltage ($V_{in}^+$). Two-phase boost converter 100 includes a node 110 connected to inductor 199, a transformer 120 connected to node 110, a first phase 130 connected to transformer 120 and a negative input voltage ($V_{in}^-$), a second phase 140 connected to first phase 130 and to transformer 120, a capacitor 150 connected to second phase 140 via nodes 171 and 173, and positive and negative output voltages ($V_{out}^+$ and $V_{out}^-$, respectively) connected to nodes 171 and 173, respectively.

Transformer 120 includes a primary winding 1210 connected to node 110 and a secondary winding 1220 connected to node 110. Transformers are well known in the art and, as such, are not described in detail herein.

First phase 130 includes a diode 1310 connected to a node 1320, which is connected to primary winding 1210. Node 1320 is also connected to a switch 1330 (e.g., a semiconductor switch), which is connected to negative input voltage $V_{in}^-$ via a node 1340.

Second phase 140 includes a node 1410 connected to diode 1310 and node 171. Node 1410 is also connected to a diode 1420 that is connected to a node 1430.

Node 1430 is further connected to secondary winding 1220 and to a switch 1440 (e.g., a semiconductor switch). Switch 1440 is connected to a node 1450, which is connected to nodes 1340 and 173.

Each of the embodiments illustrated in FIGS. 2-5 are capable of efficiently providing boost ratios other than 2:1. That is, the various embodiments described with reference to FIGS. 2-5 are capable of efficiently providing boost ratios R that are greater than and/or less than 2:1 (i.e., R<2:1<R), as well as at 2:1. Specifically, the embodiments described with reference to FIGS. 2-5 exhibit a reduced amount of ripple current as compared to contemporary two-phase boost converters at boost ratios other than 2:1.

Figure 2:
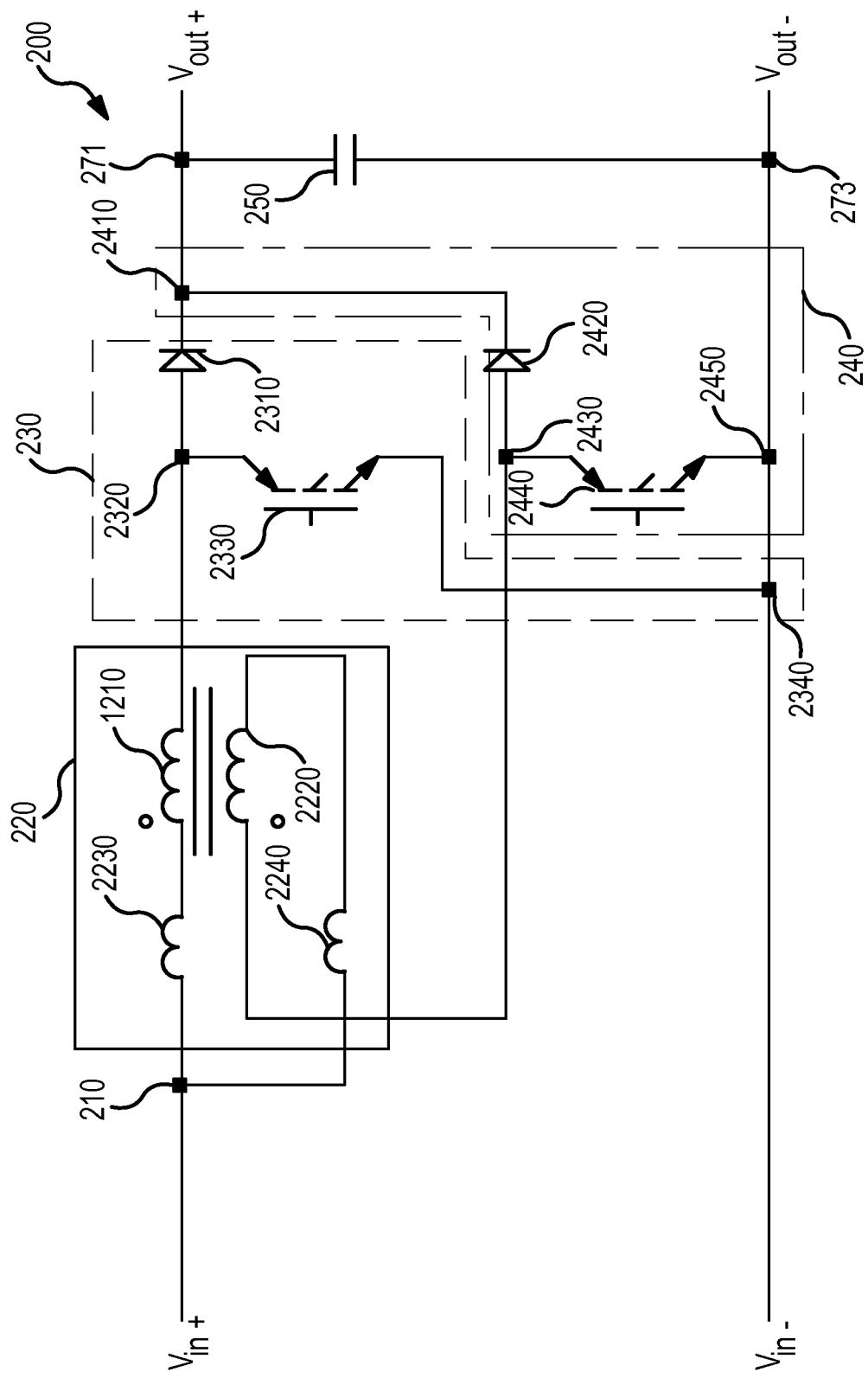
FIG. 2 is a schematic of a two-phase boost converter in accordance with one embodiment of the present invention.

Turning now to the figures, FIG. 2 is a schematic diagram of a two-phase boost converter 200 in accordance with one embodiment of the present invention. Boost converter 200 comprises a node 210 coupled to a positive input voltage ($V_{in}^+$), a transformer 220 coupled to node 210, a first phase 230 coupled to transformer 220 and a negative input voltage ($V_{in}^-$), a second phase 240 coupled to first phase 230 and to transformer 220, a capacitor 250 coupled to second phase 240 via nodes 271 and 273, and positive and negative output voltages ($V_{out}^+$ and $V_{out}^-$, respectively) coupled to nodes 271 and 273, respectively.

Transformer 220 comprises a primary winding 2210, a secondary winding 2220, an inductor 2230, and an inductor 2240. Specifically, primary winding 2210 is coupled in series with inductor 2230, which is coupled to node 210. Similarly, secondary winding 2220 is coupled in series with inductor 2240, which is coupled to node 210. Inductors 2230 and 2240 represent leakage inductance within transformer 220, which leakage inductance reduces the amount of AC ripple current for boost ratios other than 2:1 within transformer 220.

Inductors 2230 and 2240 may conceptually be shown as stand-alone inductors; however, inductors 2230 and 2240 are an enhanced form of primary winding 2210 and secondary winding 2220. That is, inductors 2230 and 2240 are enhanced parasitic transformer stray inductances formed as at least a portion of primary winding 2210 and secondary winding 2220.

First phase 230 includes a diode 2310 coupled to a node 2320, which is coupled to primary winding 2210. Node 2320 is also coupled to a switch 2330 (e.g., a semiconductor switch), which is coupled to negative input voltage $V_{in}^-$ via a node 2340.

Second phase 240 includes a node 2410 coupled to diode 2310 and node 271. Node 2410 is also coupled to a diode 2420 that is coupled to a node 2430.

Node 2430 is further coupled to inductor 2240 and to a switch 2440 (e.g., a semiconductor switch). Switch 2440 is coupled to a node 2450, which is coupled to nodes 2340 and 273.

Figure 3:
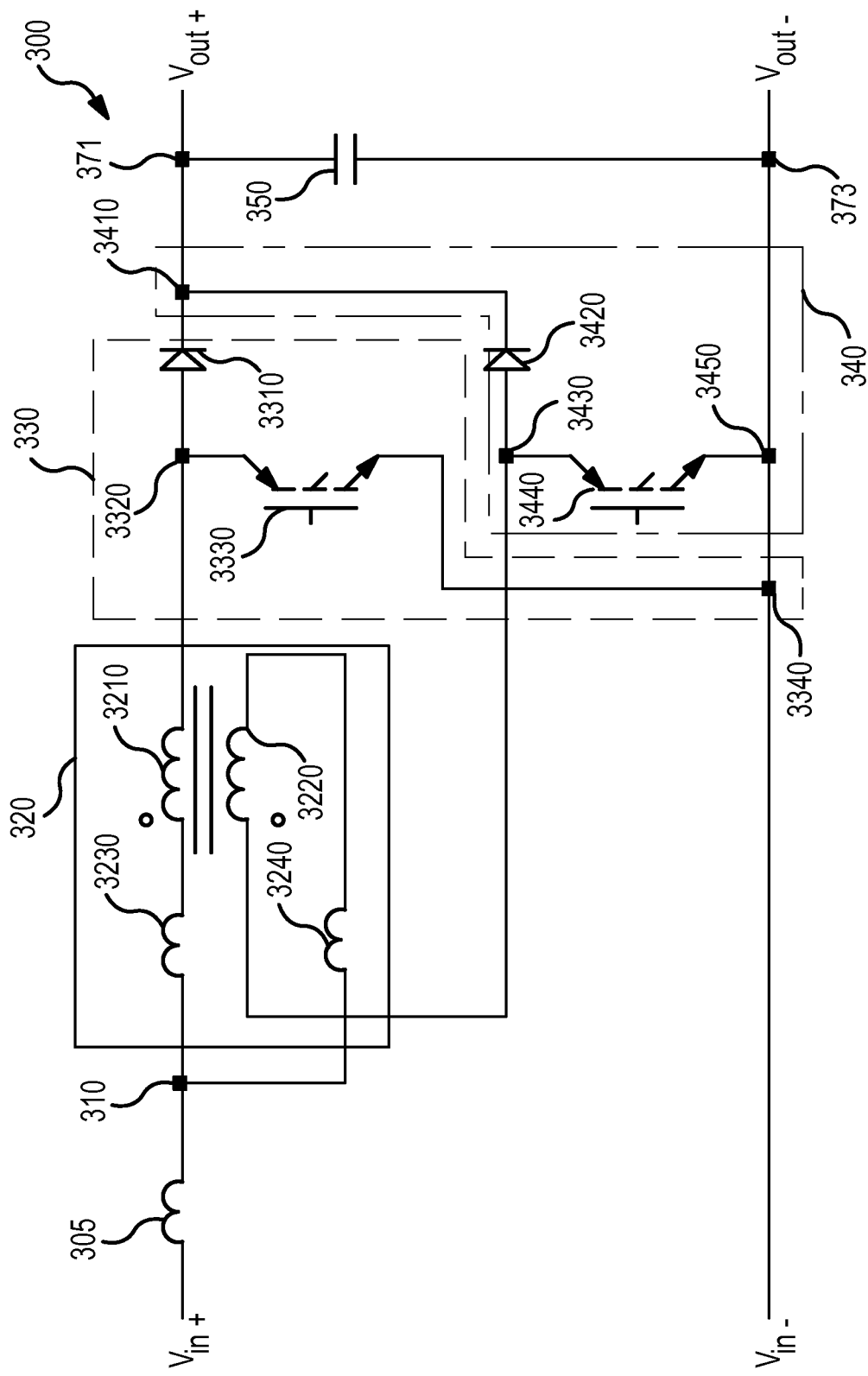
FIG. 3 is a schematic of another embodiment of a two-phase boost converter.

FIG. 3 is a schematic diagram of another embodiment of a two-phase boost converter 300. Boost converter 300 comprises an inductor 305 coupled to a positive input voltage ($V_{in}^+$), a node 310 coupled to inductor 305, a transformer 320 coupled to node 310, a first phase 330 coupled to transformer 320 and a negative input voltage ($V_{in}^-$), a second phase 340 coupled to first phase 330 and to transformer 320, a capacitor 350 coupled to second phase 340 via nodes 371 and 373, and positive and negative output voltages ($V_{out}^+$ and $V_{out}^-$, respectively) coupled to nodes 371 and 373, respectively.

Transformer 320 comprises a primary winding 3210, a secondary winding 3220, an inductor 3230, and an inductor 3240. Specifically, primary winding 3210 is coupled to inductor 3230, which is coupled to node 310. Similarly, secondary winding 3220 is coupled to inductor 3240, which is coupled to node 310. Inductors 3230 and 3240 represent leakage inductance within transformer 320, which leakage inductance reduces the amount of AC ripple current for boost ratios other than 2:1 within transformer 320.

Inductors 3230 and 3240 may conceptually be shown as stand-alone inductors; however, inductors 3230 and 3240 are an enhanced form of primary winding 3210 and secondary winding 3220. That is, inductors 3230 and 3240 are enhanced parasitic transformer stray inductances formed as at least a portion of primary winding 3210 and secondary winding 3220.

First phase 330 includes a diode 3310 coupled to a node 3320, which is coupled to primary winding 3210. Node 3320 is also coupled to a switch 3330 (e.g., a semiconductor switch), which is coupled to negative input voltage $V_{in}^-$ via a node 3340.

Second phase 340 includes a node 3410 coupled to diode 3310 and node 371. Node 3410 is also coupled to a diode 3420 that is coupled to a node 3430.

Node 3430 is further coupled to inductor 3240 and to a switch 3440 (e.g., a semiconductor switch). Switch 3440 is coupled to a node 3450, which is coupled to nodes 3340 and 373.

Figure 4:
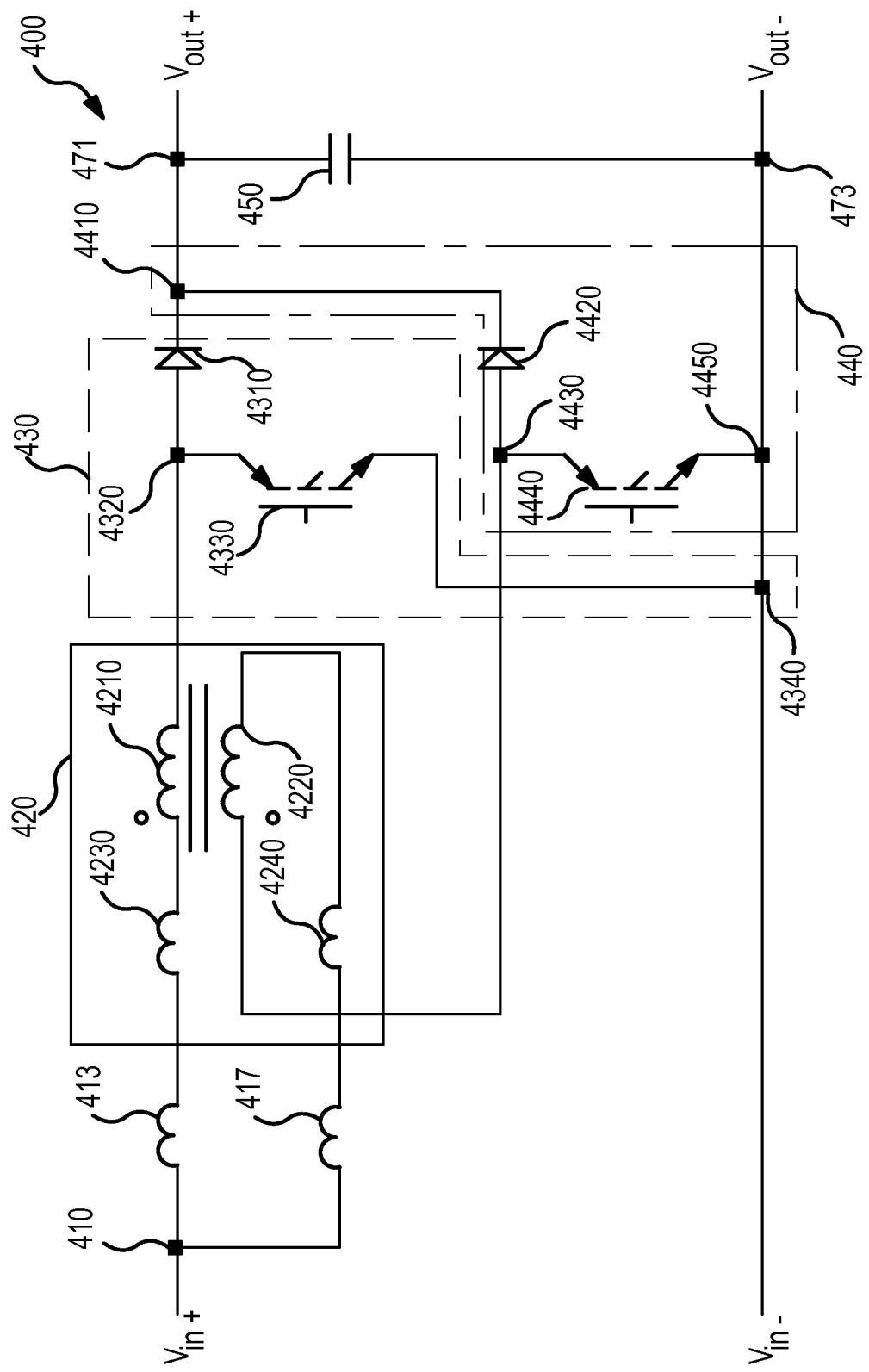
FIG. 4 is a schematic of yet another embodiment of a two-phase boost converter.

FIG. 4 is a schematic diagram of yet another embodiment of a two-phase boost converter 400. Boost converter 400 comprises a node 410 coupled to a positive input voltage ($V_{in}^+$), an inductor 413 coupled to node 410, an inductor 417 coupled to node 410, a transformer 420 coupled to inductors 413 and 417, a first phase 430 coupled to transformer 420 and a negative input voltage ($V_{in}^-$), a second phase 440 coupled to first phase 430 and to transformer 420, a capacitor 450 coupled to second phase 440 via nodes 471 and 473, and positive and negative output voltages ($V_{out}^+$ and $V_{out}^-$, respectively) coupled to nodes 471 and 473, respectively.

Transformer 420 comprises a primary winding 4210, a secondary winding 4220, an inductor 4230, and an inductor 4240. Specifically, primary winding 4210 is coupled in series with inductor 4230, which is coupled in series with inductor 413. Similarly, secondary winding 4220 is coupled in series with inductor 4240, which is coupled in series with inductor 417. Inductors 4230 and 4240 represent leakage inductance within transformer 420, which leakage inductance reduces the amount of AC ripple current for boost ratios other than 2:1 within transformer 420.

Inductors 4230 and 4240 may conceptually be shown as stand-alone inductors; however, inductors 4230 and 4240 are an enhanced form of primary winding 4210 and secondary winding 4220. That is, inductors 4230 and 4240 are enhanced parasitic transformer stray inductances formed as at least a portion of primary winding 4210 and secondary winding 4220.

First phase 430 includes a diode 4310 coupled to a node 4320, which is coupled to primary winding 4210. Node 4320 is also coupled to a switch 4330 (e.g., a semiconductor switch), which is coupled to negative input voltage $V_{in}^-$ via a node 4340.

Second phase 440 includes a node 4410 coupled to diode 4310 and node 471. Node 4410 is also coupled to a diode 4420 that is coupled to a node 4430.

Node 4430 is further coupled to inductor 4240 and to a switch 4440 (e.g., a semiconductor switch). Switch 4440 is coupled to a node 4450, which is coupled to nodes 4340 and 473.

Figure 5:
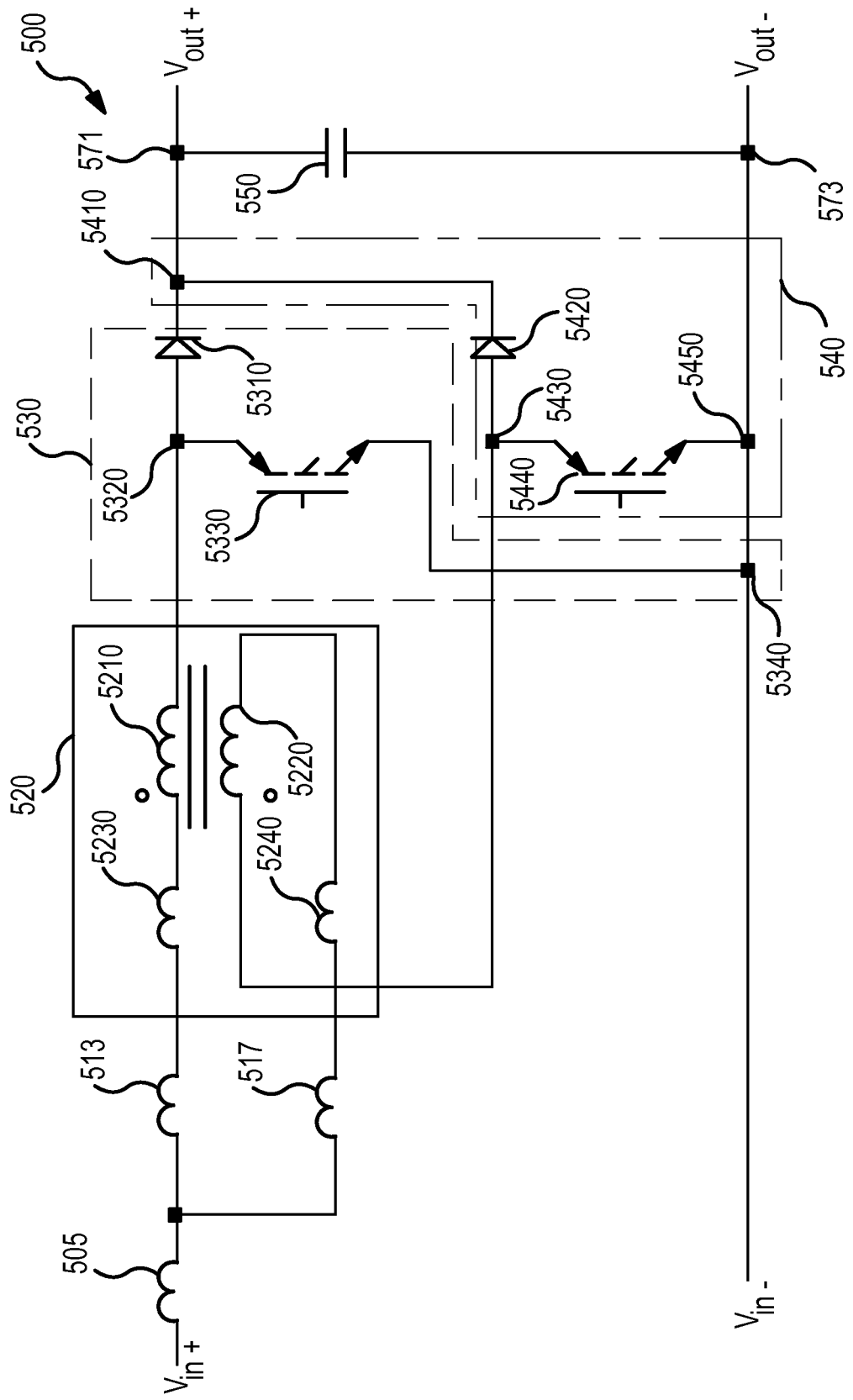
FIG. 5 is a schematic of still another embodiment of a two-phase boost converter.

FIG. 5 is a schematic diagram of still another embodiment of a two-phase boost converter 500. Boost converter 500 comprises an inductor 505 coupled to a positive input voltage ($V_{in}^+$), a node 510 coupled to inductor 505, an inductor 513 coupled to node 510, an inductor 517 coupled to node 510, a transformer 520 coupled to inductors 513 and 517, a first phase 530 coupled to transformer 520 and a negative input voltage ($V_{in}^-$), a second phase 540 coupled to first phase 530 and to transformer 520, a capacitor 550 coupled to second phase 540 via nodes 571 and 573, and positive and negative output voltages ($V_{out}^+$ and $V_{out}^-$, respectively) coupled to nodes 571 and 573, respectively.

Transformer 520 comprises a primary winding 5210, a secondary winding 5220, an inductor 5230, and an inductor 5240. Specifically, primary winding 5210 is coupled in series with inductor 5230, which is coupled in series with inductor 513. Similarly, secondary winding 5220 is coupled in series with inductor 5240, which is coupled in series with inductor 517. Inductors 5230 and 5240 represent leakage inductance within transformer 520, which leakage inductance reduces the amount of AC ripple current for boost ratios other than 2:1 within transformer 520.

Inductors 5230 and 5240 may conceptually be shown as stand-alone inductors; however, inductors 5230 and 5240 are an enhanced form of primary winding 5210 and secondary winding 5220. That is, inductors 5230 and 5240 are enhanced parasitic transformer stray inductances formed as at least a portion of primary winding 5210 and secondary winding 5220.

First phase 530 includes a diode 5310 coupled to a node 5320, which is coupled to primary winding 5210. Node 5320 is also coupled to a switch 5330 (e.g., a semiconductor switch), which is coupled to negative input voltage $V_{in}^-$ via a node 5340.

Second phase 540 includes a node 5410 coupled to diode 5310 and node 571. Node 5410 is also coupled to a diode 5420 that is coupled to a node 5430.

Node 5430 is further coupled to inductor 5240 and to a switch 5440 (e.g., a semiconductor switch). Switch 5440 is coupled to a node 5450, which is coupled to nodes 5340 and 573.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A two-phase boost converter for amplifying an input voltage, comprising:
   a first node configured to be coupled to the input voltage; and
   a transformer coupled to the first node, the transformer comprising:
      a primary input coupled to the first node,
      a primary winding coupled to the primary input,
      a first inductor coupled in series with the primary winding,
      a secondary input coupled to the first node,
      a secondary winding coupled to the secondary input,
      a second inductor coupled in series with the secondary winding, and
      wherein the first inductor and the second inductor are configured to create leakage inductance in the transformer for reducing an amount of AC ripple current within the transformer.

2. The two-phase boost converter of claim 1, wherein the transformer further comprises a primary output coupled to the primary winding and a secondary output coupled to the secondary winding, the boost converter further comprising:
   a first phase coupled to the primary output; and
   a second phase coupled to the secondary output.

3. The two-phase boost converter of claim 2, further comprising:
   a capacitor coupled to the second phase; and
   a voltage output coupled to the capacitor, wherein:
      the first phase comprises:
         a second node coupled to the primary output,
         a first switch coupled to the second node,
         a first diode coupled to the second node, and
         a third node coupled to the first switch; and
      the second phase comprises:
         a fourth node coupled to the secondary output,
         a second switch coupled to the fourth node,
         a second diode coupled to the fourth node,
         a fifth node coupled to the second switch, the third node, and the capacitor, and
         a sixth node coupled to the first diode, the second diode, and the capacitor.

4. The two-phase boost converter of claim 1, wherein the two-phase boost converter is configured to increase the input voltage by an amount greater than twice the input voltage.

5. The two-phase boost converter of claim 1, wherein the two-phase boost converter is configured to increase the input voltage by an amount less than twice the input voltage.

6. The two-phase boost converter of claim 1, wherein the transformer produces a boost ratio other than 2:1.

7. A two-phase boost converter for amplifying an input voltage, comprising: a first inductor configured to be coupled to the input voltage; a first node coupled to the first inductor; and a transformer coupled to the first node, the transformer comprising: a primary input coupled to the first node, a primary winding coupled to the primary input, a second inductor coupled in series with the primary winding, a secondary input coupled to the first node, a secondary winding coupled to the secondary input, and a third inductor coupled in series with the secondary winding wherein the second inductor and the third inductor are configured to create leakage inductance in the transformer for reducing an amount of AC ripple current within the transformer.

8. The two-phase boost converter of claim 7, wherein the transformer further comprises a primary output coupled to the primary winding and a secondary output coupled to the secondary winding, the boost converter further comprising:
   a first phase coupled to the primary output; and
   a second phase coupled to the secondary output.

9. The two-phase boost converter of claim 8, further comprising:
   a capacitor coupled to the second phase; and
   a voltage output coupled to the capacitor, wherein:
      the first phase comprises:
         a second node coupled to the primary output,
         a first switch coupled to the second node,
         a first diode coupled to the second node, and
         a third node coupled to the first switch; and
      the second phase comprises:
         a fourth node coupled to the secondary output,
         a second switch coupled to the fourth node,
         a second diode coupled to the fourth node,
         a fifth node coupled to the second switch, the third node, and the capacitor, and
         a sixth node coupled to the first diode, the second diode, and the capacitor.

10. The two-phase boost converter of claim 7, wherein the two-phase boost converter is configured to increase the input voltage by an amount greater than twice the input voltage.

11. The two-phase boost converter of claim 7, wherein the two-phase boost converter is configured to increase the input voltage by an amount less than twice the input voltage.

12. A two-phase boost converter for amplifying an input voltage, comprising: a first node configured to be coupled to the input voltage; a first inductor coupled to the first node; a second inductor coupled to the first node; a transformer coupled to the first inductor and the second inductor, the transformer comprising: a primary input coupled to the first inductor, a primary winding coupled to the primary input, a third inductor coupled in series with the primary winding, a secondary input coupled to the second inductor, a secondary winding coupled to the secondary input, and a fourth inductor coupled in series with the secondary winding wherein the third inductor and the fourth inductor are configured to create leakage inductance in the transformer for reducing an amount of AC ripple current within the transformer.

13. The two-phase boost converter of claim 12, wherein the transformer further comprises a primary output coupled to the primary winding and a secondary output coupled to the secondary winding, the boost converter further comprising:
   a first phase coupled to the primary output; and
   a second phase coupled to the secondary output.

14. The two-phase boost converter of claim 13, further comprising:
   a capacitor coupled to the second phase; and
   a voltage output coupled to the capacitor, wherein:
      the first phase comprises:
         a second node coupled to the primary output,
         a first switch coupled to the second node,
         a first diode coupled to the second node, and
         a third node coupled to the first switch; and
      the second phase comprises:
         a fourth node coupled to the secondary output,
         a second switch coupled to the fourth node,
         a second diode coupled to the fourth node,
         a fifth node coupled to the second switch, the third node, and the capacitor, and
         a sixth node coupled to the first diode, the second diode, and the capacitor.

15. The two-phase boost converter of claim 12, wherein the two-phase boost converter is configured to increase the input voltage by an amount greater than twice the input voltage.

16. The two-phase boost converter of claim 12, wherein the two-phase boost converter is configured to increase the input voltage by an amount less than twice the input voltage.

17. The two-phase boost converter of claim 12, further comprising a fifth inductor coupled between the first node and the input voltage.

* * * * *